(12) United States Patent
Rahman et al.

(10) Patent No.: US 8,406,207 B2
(45) Date of Patent: Mar. 26, 2013

(54) DIGITAL SURVEILLANCE

(75) Inventors: Moshiur Rahman, Marlboro, NJ (US); Paritosh Bajpay, Edison, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 323 days.

(21) Appl. No.: 12/829,721

(22) Filed: Jul. 2, 2010

(65) Prior Publication Data

US 2012/0002647 A1    Jan. 5, 2012

(51) Int. Cl.
*H04W 4/00* (2009.01)

(52) U.S. Cl. ........ 370/338; 370/241; 370/242; 370/245; 455/403; 455/422.1; 455/423; 455/424; 455/425; 709/223; 709/224

(58) Field of Classification Search .......... 370/216–228, 370/241–253, 310–350; 455/423–425; 709/223–224
See application file for complete search history.

(56) References Cited

U.S. PATENT DOCUMENTS

| | | | |
|---|---|---|---|
| 6,061,346 | A | 5/2000 | Nordman |
| 6,104,929 | A | 8/2000 | Josse et al. |
| 6,108,314 | A | 8/2000 | Jones et al. |
| 6,185,196 | B1 | 2/2001 | Mademann |
| 6,272,148 | B1 | 8/2001 | Takagi et al. |
| 6,469,998 | B1 | 10/2002 | Burgaleta et al. |
| 6,681,259 | B1 | 1/2004 | Lemilainen et al. |
| 6,757,269 | B2 | 6/2004 | Dorenbosch et al. |
| 6,795,701 | B1 | 9/2004 | Baker et al. |
| 6,804,532 | B1 | 10/2004 | Moon et al. |
| 7,764,784 | B2 | 7/2010 | Sewall |
| 7,884,572 | B2 | 2/2011 | Zhao |
| 7,962,569 | B2 | 6/2011 | Sewall et al. |
| 7,996,554 | B1 | 8/2011 | Venkatraman |
| 8,005,030 | B2 | 8/2011 | Stephenson et al. |
| 2002/0118663 | A1* | 8/2002 | Dorenbosch et al. .......... 370/338 |
| 2004/0146021 | A1 | 7/2004 | Fors et al. |
| 2004/0203788 | A1 | 10/2004 | Fors et al. |
| 2008/0165786 | A1* | 7/2008 | Ahuja et al. ................. 370/395.2 |
| 2008/0253314 | A1* | 10/2008 | Stephenson et al. .......... 370/326 |

* cited by examiner

*Primary Examiner* — Charles C Jiang
(74) *Attorney, Agent, or Firm* — Toler Law Group, PC

(57) ABSTRACT

In one or more embodiments, one or more methods and/or systems described can perform establishing communication with a wireless access point via a mobile device coupled to a first network; receiving at least one message via the mobile device; determining at least one issue using the at least one message; isolating the at least one issue; and determining at least one resolution to the at least one issue. In one or more embodiments, isolating the at least one issue includes determining a side of a demarcation point that is associated with the at least one issue and/or determining at least one device associated with the at least one issue. For example, the at least one device can include the wireless access point, a network device used in providing communication to the wireless access point via a second network, or a device coupled to the wireless access point.

20 Claims, 7 Drawing Sheets

DIGITAL SURVEILLANCE

BACKGROUND

1. Technical Field

This disclosure relates generally to the field of digital surveillance of a location and, more specifically, this disclosure pertains to the field of using a mobile communication device in conjunction with a wireless local area network in digital surveillance of one or more locations.

2. Description of the Related Art

In the past, a location included wireless local are network (WLAN) which included one or more devices wirelessly coupled to a wireless access point coupled to a wide area network (WAN). In this configuration, the wireless access point functions as a gateway and/or a wireless to wired bridge, and if there is problematic issue with the wireless access point and/or the WAN, network data associated with the one or more devices, which the location include, would not be communicated to and/or from the WAN.

BRIEF DESCRIPTION OF THE DRAWINGS

The preferred embodiments will become apparent upon reading the following detailed description and upon reference to the accompanying drawings in which.

Figure 1:
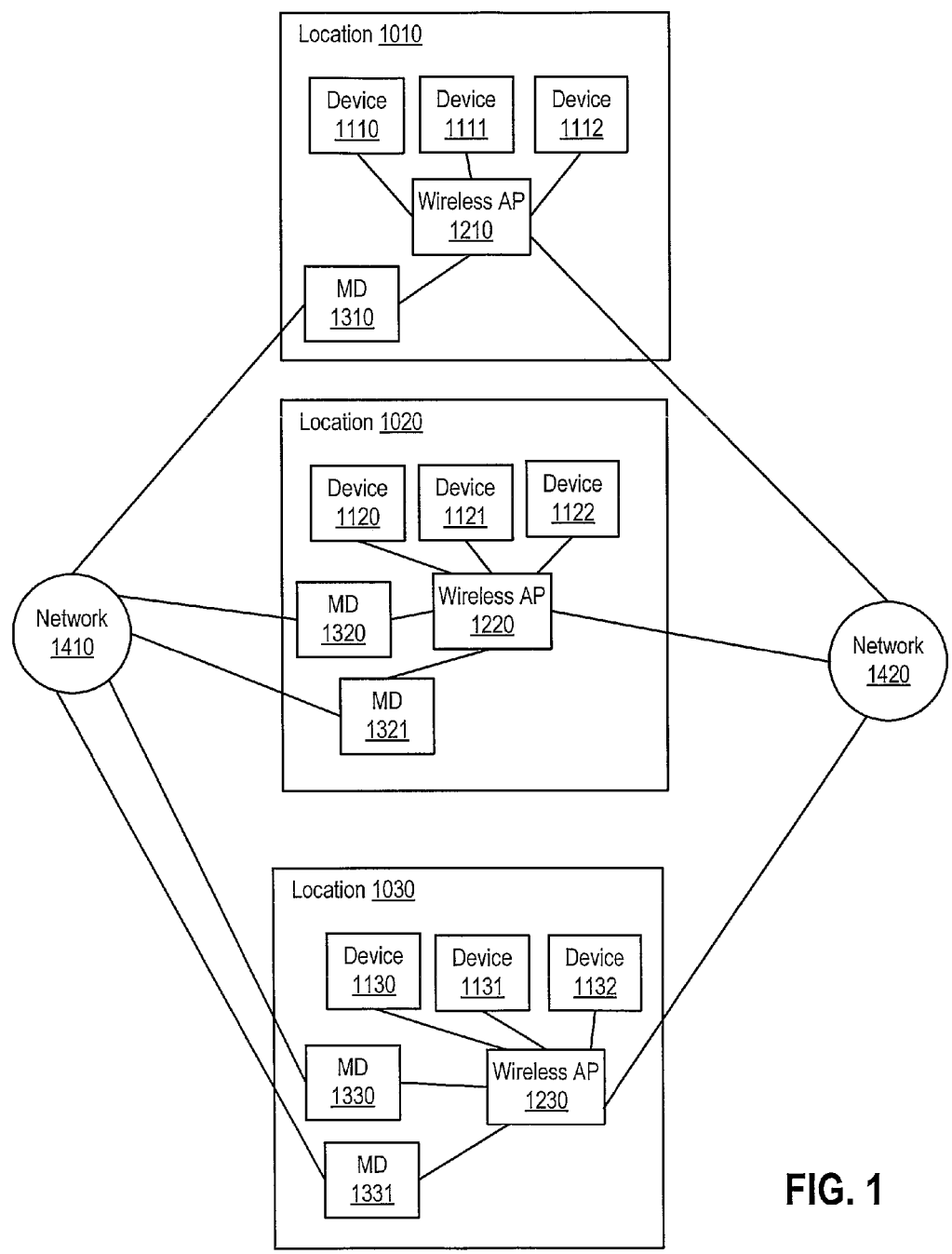
FIG. 1 provides a block diagram of one or more network communications systems, according to one or more embodiments.

While the invention is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the disclosure is to cover all modifications, equivalents and alternatives falling within the spirit and scope of an invention as defined by appended claims.

DETAILED DESCRIPTION

FIG. 1 illustrates a block diagram of one or more network communications systems, according to one or more embodiments. As shown, one or more locations 1010-1030 can respectively include one or more devices 1110-1112, 1120-1122, and 1130-1132. In one or more embodiments, one or more mobile devices (MDs) can be present and/or included at a location. As illustrated, mobile device (MD) 1310 can be present at and/or included in location 1010, MDs 1320 and 1321 can be present at and/or included in location 1020, and MDs 1330 and 1331 can present at and/or included in location 1030. In one or more embodiments, one or more locations 1010-1030 can include one or more respective wireless access points (APs) that can be wirelessly coupled to and/or wirelessly communicate with devices included in and/or present at the respective location. For example, wireless access point (AP) 1210 can be wirelessly coupled to and/or wirelessly communicate with devices 1110-1112 and 1310; wireless AP 1220 can be wirelessly coupled to and/or wirelessly communicate with devices 1120-1121, 1320, and 1321; and/or wireless AP 1230 can be wirelessly coupled to and/or wirelessly communicate with devices 1130-1132, 1330, and 1331.

In one or more embodiments, one or more of wireless APs 1210-1230 can be coupled to a network 1420 and can respectively provide communications access of network 1420 to one or more devices coupled to the respective access point. In one or more embodiments, a wireless AP (e.g., a wireless AP of wireless APs 1210-1230) can communicate with one or more devices (e.g., one or more of devices 1310-1331 and 1110-1132) using one or more of Institute of Electrical and Electronics Engineers (IEEE) 802.16, IEEE 802.11, IEEE 802.15, IEEE 802.15.4, Z-Wave, ZigBee, wireless Ethernet, ultra wide band, wireless universal serial bus (USB) and/or infrared communication technologies, among others. In one or more embodiments, a wireless AP can include a transceiver to communicate with one or more devices using one or more wireless methods, processes, protocols, and/or wireless spectrums (e.g., frequency ranges). In one example, a wireless AP can communicate with one or more devices using one or more ISM (industrial, scientific and medical) bands. For instance, an ISM band can include a frequency range of 6.765-6.795 Mhz, 433.05-434.79 Mhz, 902-928 Mhz, 2.4-2.5 Ghz, 5.725-5.875 Ghz, or 24.0-24.25 Ghz, among others.

As illustrated, MDs 1310-1331 can be coupled to a network 1410. In one or more embodiments, if network communications access via network 1420 is not available, a wireless AP and/or a device coupled to the wireless AP can use a MD to communicate with a network for network communications access. For example, if network communications access is not available to one or more devices 1120-1122 via network 1420, one or more of MDs 1320 and 1321 can provide network communications access, via network 1410, to wireless AP 1220 and/or one or more devices 1120-1122. In one or more embodiments, network 1410 can implement and/or provide access and/or services of one or more other networks. In one example, network 1410 can provide access to and/or services of a public network (e.g., the Internet) to one or more of MDs 1310-1331. In another example, network 1410 can provide access to and/or services of network 1420 and/or a network coupled to network 1420.

In one or more embodiments, network 1410 can be and/or implement a telecommunications network. For instance, network 1410 can be and/or implement a wireless telecommunications network that can support one or more wireless telecommunications network protocols such as one or more of General Packet Radio Service (GPRS), enhanced data rates for GSM (global system for mobile communications) evolution (EDGE), long term evolution, (LTE), CDMA (code division multiple access), TDMA (time division multiple access), and FDMA (frequency division multiple access), among others. In one or more embodiments, network 1410 can be coupled to and/or include a telephony network that can include a wireless cellular telecommunications network and/or a wireless satellite telecommunications network. In one or more embodiments, the telephony network can communicate information such as voice and/or data. In one or more embodiments, one or more of MDs 1310-1331 can communicate with network 1410 in a wireless fashion. In one or more embodiments, network 1410 provides access and/or services of one or more other networks at a lower data rate than a network 1420 can provide to one or more of MDs 1310-1331. For example, network 1410 can include less bandwidth than network 1420.

In one or more embodiments, network 1420 can provide access and/or services of one or more other networks to MDs 1310-1331 and/or devices 1110-1132 through one or more wireless APs. In one or more embodiments, access to these networks can include one or more "services" these networks may provide. For example, these one or more services can include one or more of: email, world wide web, file transfer, printing, file sharing, file system sharing, remote file system, network file system (NFS), news, multicast, netbios, encryption, domain name service (DNS), routing, tunneling, chat such as Internet Remote Chat and/or AOL Instant Messenger, gaming, licensing, license management, digital rights management, network time, remote desktop, remote windowing, audio, database (e.g., Oracle, Microsoft SQL Server, PostgreSQL, etc.), authentication, accounting, authorization, virtual local area network (VLAN) (e.g., IEEE 802.1q), virtual private network or VPN, audio, phone, Voice Over Internet Protocol (VoIP), paging, and video, among others. In one or more embodiments, the one or more service can be associated with and/or correspond to one or more protocols of one or more computer and/or software applications.

In one or more embodiments, a wireless AP can provide authentication, quality of service (QoS), communication traffic shaping, and/or access control from one or more devices coupled to the wireless AP. For example, wireless AP 1210 can include an access control list that can be modifiable, and wireless AP 1210 can use the access control list to permit and/or deny access of one or more devices (e.g., devices 1110-1112 and 1310) to network 1420. In one or more embodiments, wireless AP 1210 can perform one or more processes and/or methods that can modify the access control list. In one or more embodiments, wireless AP 1210 can receive one or more signals from a remote signaling device, and the access control list of wireless AP 1210 can be modified based on the received one or more signals from the remote signaling device. In one or more embodiments, signals and/or signaling can be used in communicating establishment and/or control of communications and/or access to a network and/or resources of the network. In one or more embodiments, signals and/or signaling can be used between two different network providers or between two systems of a single network provider. In one example, a first network provider can be or include a second network provider, and signals and/or signaling can be used between the first network provider and the second network provider can mean signaling between two systems of the first network provider. In one or more embodiments, signals and/or signaling can be used to convey information (e.g., configuration messages, accounting messages, network management data, control data, etc.) that is different than user information transfer (e.g., a telephone conversation between two users, a text message communication between two users, etc.).

In one or more embodiments, network 1410 and/or network 1420 can include a wired network, a wireless network or a combination of wired and wireless networks. Network 1410 and/or network 1420 can include and/or be coupled to various types of communications networks, such as a public switched telephone network (PSTN), an Internet, a wide area network (WAN) (e.g., a private WAN, a corporate WAN, a public WAN, etc.), a local area network (LAN). In one or more embodiments, a wireless AP can be coupled to a PSTN, e.g., via: Ethernet cable and DSL; a cable (television) based network; a satellite-based system; and/or a fiber based network; among others. In one or more embodiments, network 1410 and/or network 1420 can include one or more wireless networks, e.g., based on IEEE 802.11 and/or IEEE 802.16. For instance, one or more of wireless APs 1210-1230 can be coupled to network 1420 in a wireless fashion. Network 1410 and/or network 1420 can include one or more DSL (digital subscriber line) and/or cable (e.g., cable television) networks and/or infrastructures. For example, network 1410 and/or network 1420 can include one or more of: cable modems, cable modem termination systems (CMTSs), satellite modems, DSL modems, digital subscriber line access multiplexers (DSLAMs), broadband remote access servers (BRASs), telecommunications circuits, and/or metropolitan area networks (MANs), among others. In one or more embodiments, network 1420 may form part of the Internet, or may couple to other networks, e.g., other local or wide area networks such as the Internet. In one or more embodiments, a wireless AP can be a system operable to be coupled to and/or include networking equipment usable to couple the wireless AP to network 1420. In one example, wireless AP 1210 can include a wired Ethernet interface that can be coupled to a cable modem or a DSL modem that can be coupled to network 1420. In another example, wireless AP 1220 can include a FDDI (fiber distributed data interface) that can be coupled to a router and/or gateway device that can be coupled to network 1420.

In one or more embodiments, each MD of MDs 1310-1331 can include and/or can be coupled to one or more transceivers that allow the MD to communicate with network 1410 and/or a wireless AP of wireless APs 1210-1230. For example, MD 1310 can include or be coupled to a first transceiver that can communicate with network 1410 and/or include or be coupled to a second transceiver to communicate with wireless AP 1210. For instance, MD 1310 can include or be coupled to a first transceiver that can communicate with a cellular telephone system of or coupled to network 1410 and/or include or be coupled to a second transceiver, such as a wireless Ethernet transceiver, to communicate with wireless AP 1210. In one or more embodiments, a MD can use the first transceiver and the second transceiver to provide network communication access to one or more devices 1110-1112 and/or one or more wireless APs. For example, MD 1310 can use the first transceiver and the second transceiver to provide network communication access to one or more of devices 1110-1112 and wireless AP 1210 via network 1410.

In one or more embodiments, locations 1010-1030 can include one or more of hotels, homes, airports, restaurants, geographic regions, planes, trains, automobiles, and coffee shops, among others. In one or more embodiments, devices 1110-1132 can include one or more of computer systems, televisions, digital video recorders, light switches, lamps, clothes washing machines, clothes drying machines, lawn mowers, refrigerators, stoves, ovens, computing devices, video disk players, video players, components of an entertainment system, video gaming consoles, alarm systems, lawn care systems (e.g., lawn sprinkler systems), and healthcare systems, among others.

Figure 2:
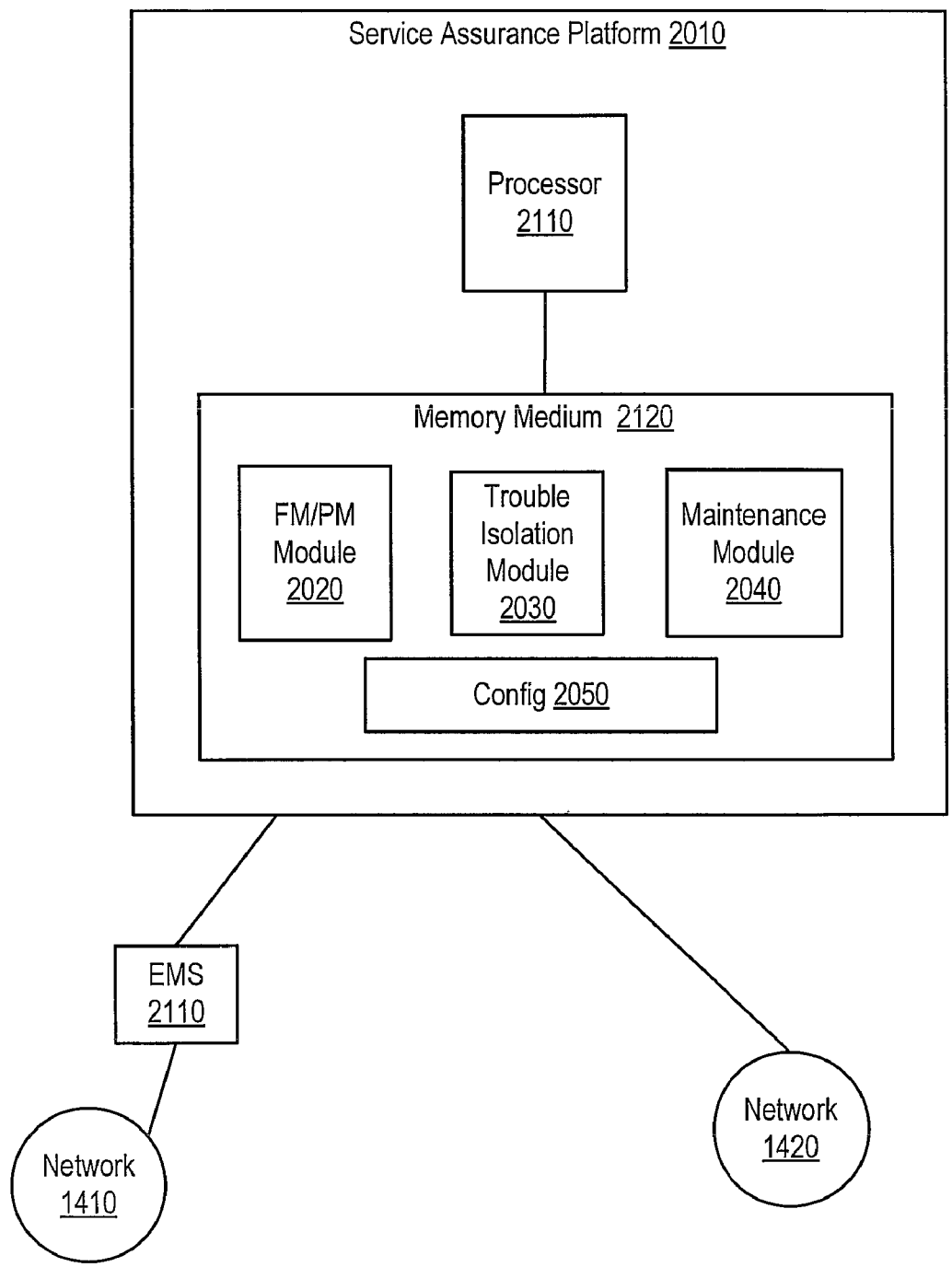
FIG. 2 provides a block diagram of a service assurance platform, according to one or more embodiments.

Turning now to FIG. 2, a block diagram of a service assurance platform is illustrated, according to one or more embodiments. As shown, a service assurance platform (SAP) 2010 can include one or more modules, such as one or more of a FM/PM (fault management/performance management) module 2020, a trouble isolation module 2030, and a maintenance module 2040, among others. In one or more embodiments, SAP 2010 can be coupled to network 1410. For example, SAP 2010 can be coupled to network 1410 via an element management system (EMS) 2110. In one or more embodiments, EMS 2110 can aggregate and/or collect multiple messages (e.g., network management data and/or messages, fault messages, etc.) for SAP 2010. In one or more embodiments, SAP 2010 can be coupled to network 1420.

In one or more embodiments, SAP 2010 can include a computer system and modules 2020-2040 can be included in a memory medium of the computer system and executed by a processor of the computer system. As illustrated, SAP 2010 can include a processor 2110 and a memory medium 2120 coupled to processor 2110, and memory medium 2120 can include modules 2020-2040 and configuration 2050. In one or more embodiments, SAP 2010 can include multiple computer systems and modules 2020-2040 can be distributed between or among the computer systems. For example, one or more of modules 2020-2040 can be included in a memory of a first computer system and executed by a processor of the first computer system, and the other module(s) 2020-2040 can be included in a memory of a second computer system and executed by a processor of the second computer system.

In one or more embodiments, fault management can include monitoring and/or determining of one or more hardware faults, and/or performance management can include monitoring and/or determining of one or more of packet loss, packet jitter, packet delay, and packet latency, among others. In one or more embodiments, FM/PM module 2020 can determine whether or not a hardware fault and/or a performance fault is an issue (e.g., a problem) with one or more devices and/or a wireless local area network at a location (e.g., a location of locations 1010-1030). For example, FM/PM module 2020 can receive one or more messages from MD 1321 via network 1410 and can determine whether or not a hardware fault and/or a performance fault is an issue (e.g., a problem) with one or more devices 1120-1122 and/or a wireless local area network supported by wireless AP 1220 at location 1020.

In one or more embodiments, trouble isolation module 2030 can determine a side of a demarcation point (demarc) that has and/or is associated with an issue (e.g., a problem). In one or more embodiments, a demarc can be a point where a network provider's network ends or terminates and connects or couples to a customer premise network, wiring, and/or equipment. In one example, a first side of the demarc can include devices 1120-1122 and wireless AP 1220. In another example, a first side of the demarc can include devices 1120-1122 and a second side of the demarc can include wireless AP 1220. In one or more embodiments, the second side of the demarc can include one or more network elements of network 1420 and/or one or more network elements and/or devices that are used to provide communications of one or more devices at a location (e.g., a location of locations 1010-1030) with network 1420. In one or more embodiments, the first side of the demarc can include customer premise equipment and/or customer provided equipment.

In one example, the customer premise equipment can be owned and operated by a network provider. In a second example, the customer provided equipment can be owned by a customer or subscriber of the network provider and operated by the network provider. In a third example, the customer provided equipment can be owned and operated by a customer or subscriber of the network provider. In another example, the customer provided equipment can be owned by a customer or subscriber of the network provider and operated by the network provider and the customer or subscriber. For instance, the customer and/or subscriber can configure a first portion of a configuration of the customer provided equipment and the network provider can configure a second portion of the configuration of the customer provided equipment. For example, the customer and/or subscriber can configure one or more subnets and/or routings of the customer provided equipment, and the network provider can configure one or more bandwidths, routings, softwares, and/or firmwares of the customer provided equipment.

In one or more embodiments, trouble isolation module 2030 can include and/or utilize configuration 2050 and/or rules that can be included in configuration 2050 in determining a side of a demarc that has and/or is associated with an issue. In one example, a wireless AP can include one or more rules and/or configurations that can provide information to trouble isolation module 2030 regarding the first side of the demarc. For instance, wireless AP can include one or more rules and/or configurations associated with one or more of network topology and routing, among others, of devices at location 1020, and trouble isolation module 2030 can utilize the one or more rules and/or configurations of wireless AP 1020. In one or more embodiments, trouble isolation module 2030 can interact with one or more devices to determine one or more issues. In one example, trouble isolation module 2030 can interact with one or more of devices 1110-1132 and wireless APs 1210-1230 to determine one or more issues. In another example, trouble isolation module 2030 can interact with one or more devices, such as one or more network elements of network 1420 and/or one or more network elements and/or devices that are used to provide communications of one or more devices at location 1020 with network 1420, to determine one or more issues.

In one or more embodiments, trouble isolation module 2030 can determine one or more devices that have and/or are associated with one or more issues (e.g., problems). In one example, trouble isolation module 2030 can determine that one or more of devices 1120-1122 and wireless AP 1220 have and/or are associated with one or more issues. In another example, trouble isolation module 2030 can determine that one or more devices, such as one or more network elements of network 1420 and/or one or more network elements and/or devices that are used to provide communications of one or more devices at location 1020 with network 1420, have and/or are associated with one or more issues.

In one or more embodiments, maintenance module 2040 can include and/or utilize one or more configurations and/or rules (e.g., rules included in configuration 2050) to address an issue (e.g., a problem). In one or more embodiments, maintenance module 2040 can determine one or more actions that can be taken to resolve an issue. In one or more embodiments, resolving an issue can include one or more of addressing and/or correcting the issue. In one example, maintenance module 2040 can issue a maintenance request for one or more service personnel to address an issue. In one instance, the one or more service personnel can address one or more issues that may not be able to be addressed by maintenance module 2040. In another instance, the one or more service personnel can be dispatched to physically inspect, repair, and/or replace one or more devices. In a second example, maintenance module 2040 can send, provide, and/or issue one or more messages that can resolve an issue. For instance, maintenance module 2040 can send, provide, and/or issue one or more messages that can change and/or augment a routing path (e.g., a routing path that utilizes one or more network elements of network 1420 and/or one or more network elements and/or devices that are used to provide communications of one or more devices at location 1020 with network 1420).

Figure 3:
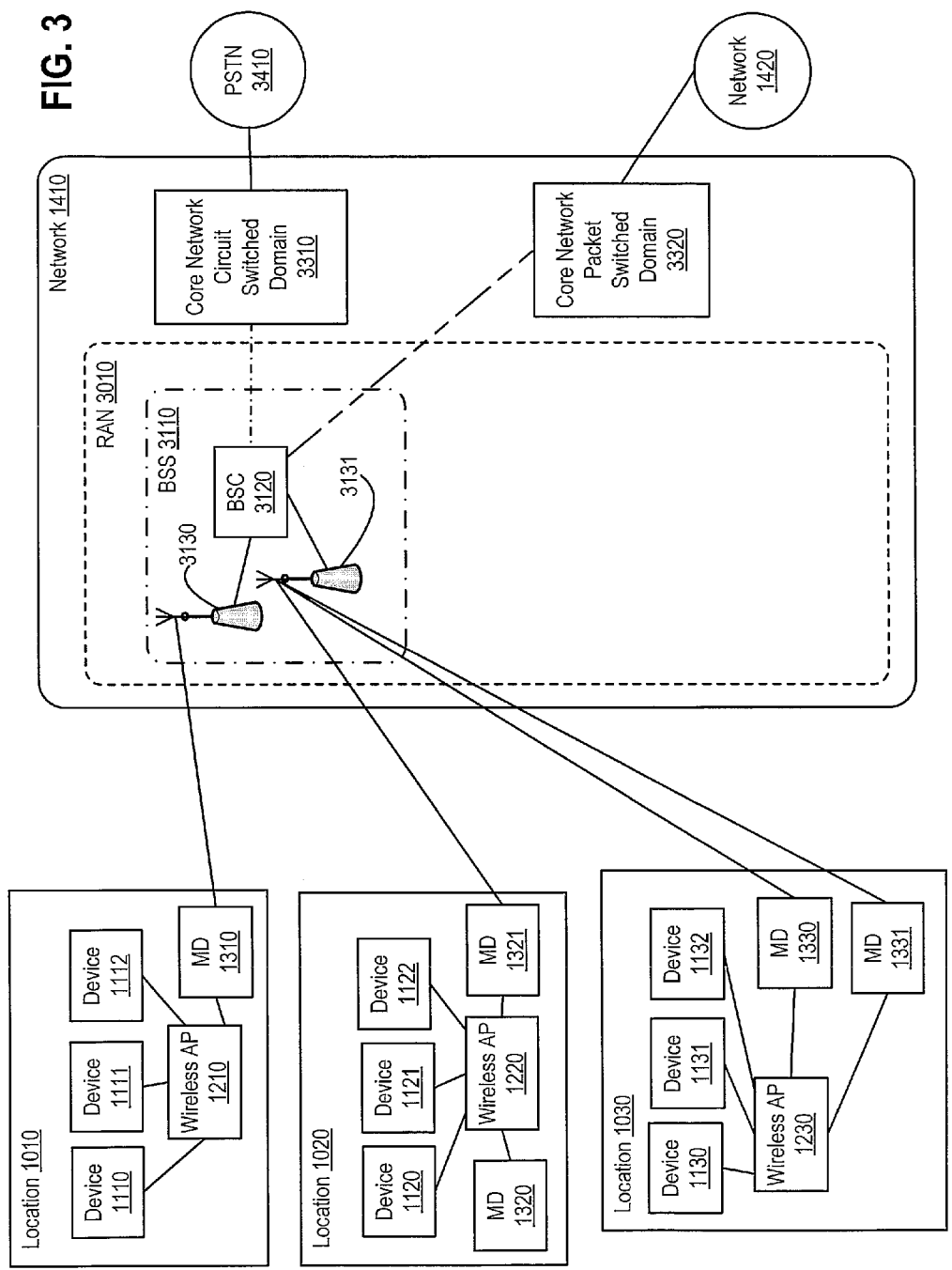
FIG. 3 provides a block diagram of one or more network communications systems, according to one or more embodiments.

Turning now to FIG. 3, a block diagram of one or more network communications systems is illustrated, according to one or more embodiments. As shown, network 1410 can include a radio access network (RAN) 3010 that can include a base station subsystem (BSS) 3110. As illustrated, BSS 3110 can include a base station controller (BSC) 3120 and one or more base transceiver stations (BTSes) 3130 and 3131 that can be coupled to BSC 3120. In one or more embodiments, a base transceiver station (BTS) can include one or more transmitters, one or more receivers, one or more transceivers, one or more antennas, and/or one or more cryptography devices that can be used to communicate with one or more mobile devices 1310-1331 and BSC 3120. For example, the one or more transmitters, the one or more receivers, and/or the one or more transceivers of the BTS can communicate via a layer one of an air interface (e.g., a wireless interface). In one or more embodiments, the one or more antennas of the BTS can be mounted on a roof of a building, on a mast, on a tower (e.g., a cellular telephone communications tower), and/or on a side of a structure (e.g., a building, a parking garage, a lamp post, etc.).

As illustrated, BSC 3120 can be coupled to one or more of a core network circuit switched domain 3310 and a core network packet switched domain 3320. As shown, core network circuit switched domain 3310 and core network packet switched domain 3320 can be respectively coupled to a PSTN 3410 and network 1420. In one or more embodiments, BSC 3120 can communicate telephonic and/or circuit switched data via core network circuit switched domain 3310 to PSTN 3410 and/or packet switched data (e.g., IP data) via core network packet switched domain 3320 to network 1420. As illustrated, MD 1310 can be coupled BTS 3130, and MDs 1321-1331 can be coupled to BTS 3131. In one or more embodiments, MD 1310 and BTS 3130 can communicate in a wireless fashion, and MDs 1321-1331 can communicate with BTS 3131 in a wireless fashion.

Figure 4:
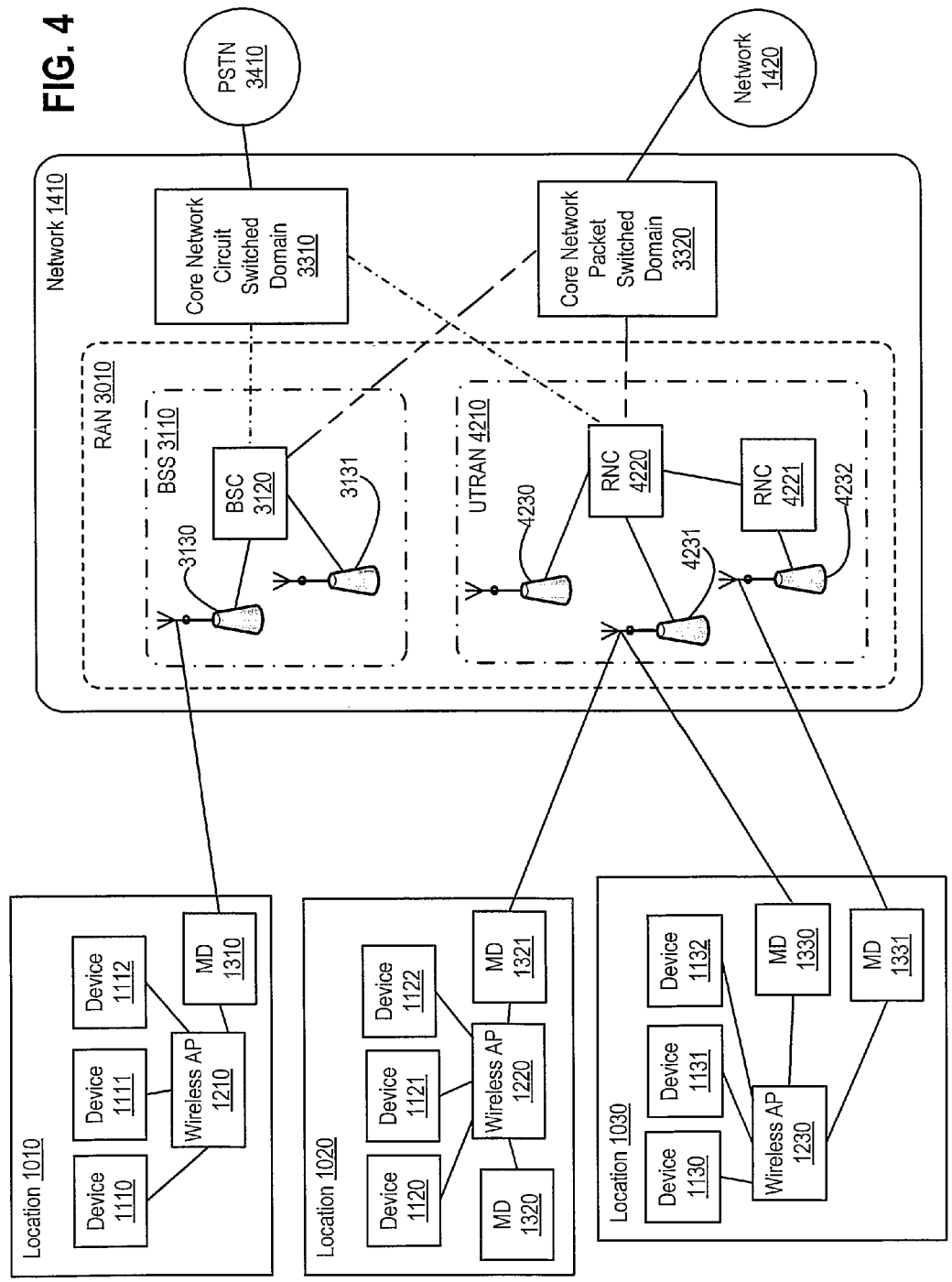
FIG. 4 provides a block diagram of one or more network communications systems, according to one or more embodiments.

Turning now to FIG. 4, a block diagram of one or more network communications systems is illustrated, according to one or more embodiments. As shown, network 1410 can include RAN 3010 that can include a universal mobile telecommunications system (UMTS) terrestrial radio access network (UTRAN) 4210. As illustrated, UTRAN 4210 can include one or more radio network controllers (RNCs) 4220 and 4221, one or more Node Bs 4230 and 4231 coupled to radio network controller (RNC) 4220, and/or a Node B 4232 coupled to RNC 4221 which can be coupled to RNC 4220. In one or more embodiments, a Node B can denote include a base transceiver station in a UMTS and can include one or more transmitters, one or more receivers, one or more transceivers, and/or one or more antennas. In one example, a Node B can utilize a wideband code division multiple access (WCDMA) and/or a time division synchronous code division multiple access (TD-SCDMA) in implementing an air interface (e.g., wireless interface) with one or more mobile devices. In another example, a Node B can be controlled by a RNC (e.g., Node B 4232 can be controlled by RNC 4221). In one or more embodiments, the one or more antennas of the Node B can be mounted on a roof of a building, on a mast, on a tower (e.g., a cellular telephone communications tower), and/or on a side of a structure (e.g., a building, a parking garage, a lamp post, etc.).

As illustrated, RNC 4220 can be coupled to can be coupled to one or more of core network circuit switched domain 3310 and core network packet switched domain 3320. In one or more embodiments, RNC 4220 can communicate telephonic and/or circuit switched data via core network circuit switched domain 3310 to PSTN 3410 and/or packet switched data (e.g., IP data) via core network packet switched domain 3320 to network 1420. In one or more embodiments, RNC 4221 can be coupled to RNC 4220, and RNC 4221 can communicate telephonic and/or circuit switched data with PSTN 3410 via RNC 4220 and/or packet switched data (e.g., IP data) with network 1420 via RNC 4220. As shown, MD 1310 can be coupled BTS 3130, MDs 1321 and 1330 can be coupled to Node B 4231, and MD 1331 can be coupled Node B 4232. In one or more embodiments, MDs 1321 and 1330 can communicate with NodeB 4231 in a wireless fashion, and MD 1331 can communicate with Node B 4232 in a wireless fashion.

Figure 5:
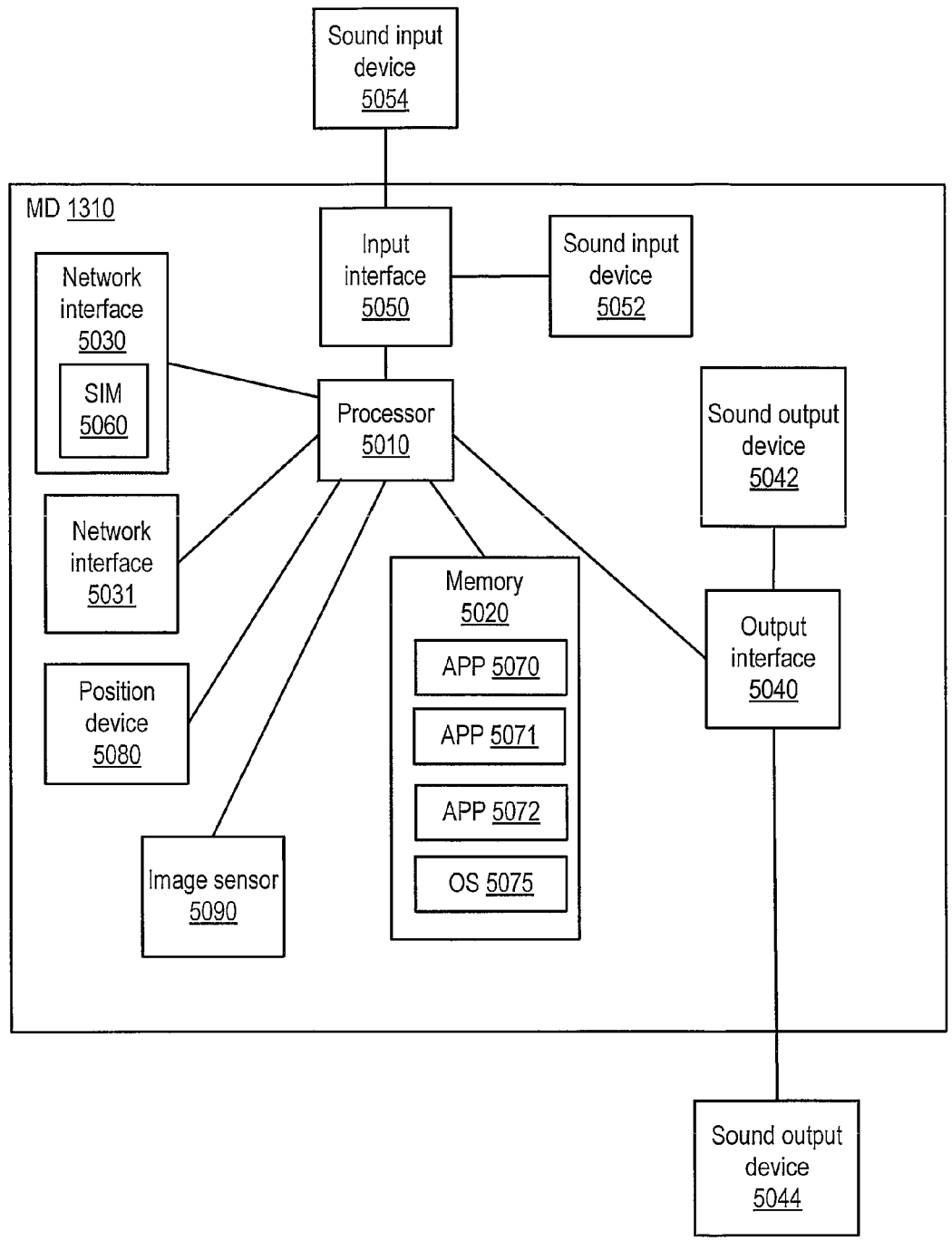
FIG. 5 provides a block diagram of a mobile device, according to one or more embodiments.

Turning now to FIG. 5, a block diagram of a mobile device is illustrated, according to one or more embodiments. As shown, MD 1310 can include a memory 5020 coupled to a processor 5010, and MD 1310 can include network interfaces 5030 and 5031, a user output interface 5040, a user input interface 5050, a position device 5080, and an image sensor 5090 coupled to processor 5010. In one or more embodiments, memory 5020 can include one or more applications (APPs) 5070-5072 and/or operating system (OS) 5075 that can include instructions executable by processor 5010 to implement one or more methods and/or one or more systems associated with MD 1310. In one or more embodiments, MD 1310 may be any of various types of devices, including a computer system, such as a portable computer, a personal digital assistant (PDA), a mobile telephone (e.g., a cellular telephone, a satellite telephone, etc.), a wearable computing device, an Internet appliance, a communications device, a handheld mobile computing device, or other wireless device. In one or more embodiments, processor 5010 can include one or more cores, and each core of processor 5010 can implement an instruction set architecture (ISA).

In one or more embodiments, user output interface 5040 can be used to convey information (e.g., text, graphic, video, haptic, audio, etc.) to a user of MD 1310. For example, MD 1310 may include a display (e.g., a display screen) that can be used to convey text, graphic, image, motion picture, and/or video information to a user of MD 1310. In one or more embodiments, MD 1310 can include a sound output device 5042 coupled to user output interface 5040. In one or more embodiments, sound output device 5042 can include a device and/or circuitry that can produce one or more sounds.

In one or more embodiments, user output interface 5040 can be coupled to a sound output device 5044. In one instance, sound output device 5044 can include one or more of an amplifier and/or a speaker. In another instance, sound output device 5044 can include one or more earphones. In one or more embodiments, user output interface 5040 can be coupled to sound output device 5044 in a wired fashion. In one or more embodiments, user output interface 5040 can be coupled to sound output device 5044 in a wireless fashion. In one example, user output interface 5040 can communicate sound information to output device 5044 using an ISM (industrial, scientific, measurement) band. For instance, user output interface 5040 can communicate sound information to sound output device 5044 using one or more of a personal are network (PAN), IEEE 802.15, IEEE 802.15.4, ZigBee, 6LoWPAN, frequency modulation of a carrier wave, amplitude modulation of a carrier wave, light signals, and serial pulses, among others. In one or more embodiments, sound output device 5044 can be or be included in a device that includes an IEEE 802.15 receiver or transceiver, such as a Bluetooth headset or earpiece.

In one or more embodiments, user input interface 5050 can be used to receive sounds from a user of MD 1310. In one example, MD 1310 can include a sound input device 5052 coupled to user input interface 5050. In one instance, sound input device 5052 can include a microphone. In another example, a sound input device 5054 coupled to user input interface 5050. In one or more embodiments, a sound input device can include a device and/or circuitry that can receive one or more sounds and transform the one or more sounds into one or more electrical signals (e.g., voltage and/or current). In one or more embodiments, a sound input device can include an acoustic to electric transducer or sensor that can convert one or more sounds into one or more electrical signals. For example, the acoustic to electric transducer or sensor can include a body (e.g., a diaphragm, a crystal, a ceramic, etc.) that can vibrate in response to one or more sounds (e.g., in response to sound pressure), and movement of the body can be transformed and/or converted into one or more electrical signals. For instance, a sound input device can include a microphone. In one or more embodiments, a microphone can use one or more of capacitance change (e.g., a condenser microphone), electromagnetic induction (e.g., a dynamic microphone), piezoelectric generation, and light modulation to produce one or more electrical signal from one or more mechanical vibrations.

In one or more embodiments, user input interface 5050 can be coupled to sound input device 5054 in a wired fashion. In one or more embodiments, user input interface 5050 can be coupled to sound input device 5054 in a wireless fashion. In one example, user input interface 5050 can communicate sound information to sound input device 5054 using an ISM band. For instance, sound input device 5054 can communicate sound information to user input interface 5050 using one or more of a PAN, IEEE 802.15, IEEE 802.15.4, ZigBee, 6LoWPAN, frequency modulation of a carrier wave, amplitude modulation of a carrier wave, light signals, and serial pulses, among others. In one or more embodiments, sound input device 5054 can be or be included in a device that includes an IEEE 802.15 transmitter or transceiver, such as a Bluetooth headset or microphone.

In one or more embodiments, user input interface can be used to receive user input from a user of MD 1310. In one example, MD 1310 may include a keyboard that can be used to receive user input from a user of MD 1310. In another example, MD 1310 may include one or more sensors that can be used to receive user input from a user of MD 1310. In one instance, one or more sensors can include resistive sensors that can be used to determine one or more positions on a display screen. In another instance, one or more sensors can include capacitive sensors that can be used to determine one or more positions on a display screen. In one or more embodiments, user output interface 5040 and user input interface 5050 can be used to implement a keyboard. For example, user output interface 5040 can be used to present an image of a keyboard, and user input interface 5050 can receive a position of user input on the image of the keyboard to determine a received key of the keyboard.

In one or more embodiments, network interface 5030 can include a transceiver that is operable to communicate information with network 1410. In one or more embodiments, network interface 5030 can be used to couple MD 1310 to network 1410, and MD 1310 can use network interface 5030 to communicate information (e.g., data, voice data, etc.) with network 1410. In one or more embodiments, network interface 5030 can include a subscriber identity module (SIM) 5060. In one or more embodiments, SIM 5060 can securely store an international mobile subscriber identity (IMSI) which can include a unique number and/or identity associated with a GSM network and/or a UMTS network. In one example, the unique number and/or identity can be used to determine information corresponding to MD 1310 from a home location register (HLR) and/or from a visitor location register (VLR). In one or more embodiments, a MSISDN (mobile subscriber ISDN (integrated services digital network) number, mobile station international ISDN number(s), or mobile international ISDN number) can be a number that can uniquely identify a subscription in a GSM mobile network and/or a UMTS (universal mobile telecommunications system) mobile network. For example, the MSISDN can include a telephone number corresponding to SIM 5060. In one instance, the MSISDN can include a country code, a national destination code, and a subscriber number. In another instance, the MSISDN can include a country code, a number planning area, and a subscriber number.

In one or more embodiments, SIM 5060 can be embodied in a removable card (e.g., a SIM card) that can be removed from a first MD associated with a first subscriber account and placed in a second MD, so that the second MD can be associated with the first subscriber account. For example, SIM 5060 embodied as a SIM card can be associated with a first subscriber account and used in MD 1310, thereby associating MD 1310 with the first subscriber account; SIM 5060 can be removed from MD 1310, thereby disassociating MD 1310 with the first subscriber account; and SIM 5060 can be placed in MD 1320, thereby associating MD 1320 with the first subscriber account.

In one or more embodiments, network interface 5031 can be used to communicate with a wireless AP. For example, network interface 5031 can be configured and used to communicate with wireless AP 1210 in a wireless fashion. In one or more embodiments, network interface 5031 can include a transceiver that is operable to communicate information with a wireless AP.

In one or more embodiments, MD 1310 can include a position device 5080 coupled to processor 5010. In one example, position device 5080 can include a global positioning system (GPS) receiver. In another example, position device 5080 can include a terrestrial radio navigation system receiver such as LORAN (LOng RAnge Navigation). In one or more embodiments, position device 5080 can provide one or more services such as one or more of positioning, navigation, and timing to processor 5010. For example, a positioning service can provide one or more of latitude information, longitude information, altitude information, and accuracy information (e.g., a radius of uncertainty for a geographic location or position).

In one or more embodiments, position device 5080 can provide heading information. For example, position device 5080 can include a compass and/or implement a compass to provide heading information. In one or more embodiments, position device 5080 can provide device position information such as tilt and/or angle information. For example, position device 5080 can include one or more of an accelerometer and an electronic gyroscope. In one or more embodiments, the compass can be electronically gimbaled using one or more of an accelerometer and an electronic gyroscope.

In one or more embodiments, electronic image sensor 5090 can provide digital data of one or more of an image, a motion picture, and a video. For example, electronic image sensor 5090 can be or include a digital camera. In one or more embodiments, the digital data of one or more of an image, a motion picture, and a video can include one or more formats. For example the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, among others. In one or more embodiments, one or more of MDs 1320-1331 can include same or similar structures and/or functionalities of those described with reference to MD 1310.

Figure 6:
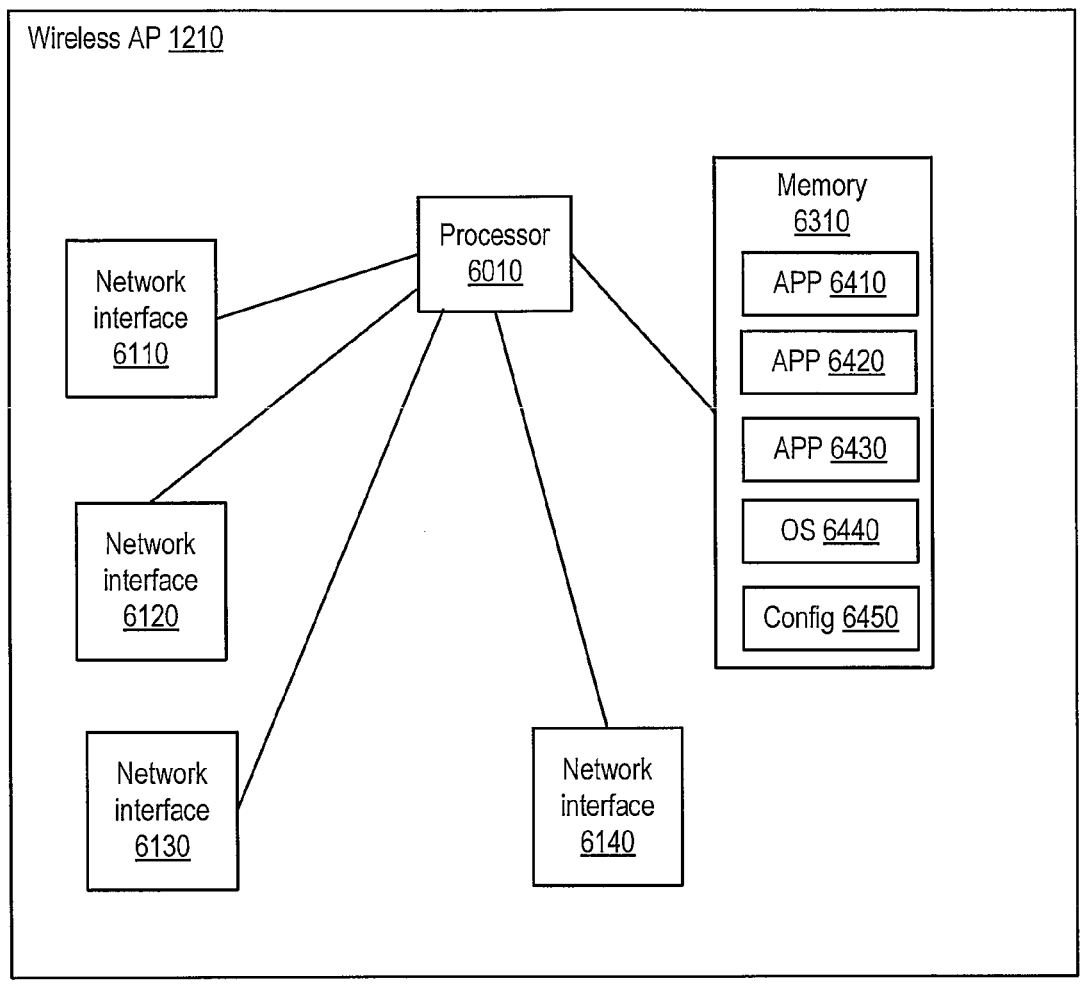
FIG. 6 provides a block diagram of a wireless access point, according to one or more embodiments.

Turning now to FIG. 6, a block diagram of a wireless access point is illustrated, according to one or more embodiments. As shown, wireless AP 1210 can include a memory 6310 coupled to a processor 6010, and wireless AP 1210 can include one or more network interfaces 6110-6140 coupled to processor 6010. In one or more embodiments, a network interface (e.g., a network interface from network interfaces 4110-4140) can be coupled to network 1420. In one example, network interface 6110 can implement an Ethernet interface that is operable to be coupled to a cable modem, a router, or a DSL modem, among others, where the cable modem, the router, or the DSL modem is operable to be coupled to network 1420. In another example, network interface 6110 can implement a WiMax network interface that is operable to be coupled to a WiMax access point that is operable to be coupled to network 1420.

In one or more embodiments, a network interface (e.g., a network interface from network interfaces 6110-6140) can be coupled to one or more devices (e.g., MD 1310, devices 1110-1112, etc.), in a wireless fashion. In one example, network interface 6120 can implement an IEEE 802.11 interface that can wirelessly communicate with one or more devices (e.g., one or more of devices 1110-1112 and 1310). In a second example, network interface 6130 can implement an IEEE 802.15.4 interface that can wireless communicate with one or more devices (e.g., one or more of devices 1110-1112 and 1310). In another example, network interface 6140 can implement a wireless USB interface that can wireless communicate with one or more devices (e.g., one or more of devices 1110-1112 and 1310).

As shown, memory 6310 can include one or more APPs 6410-6430, an OS 6440, and/or a configuration 6450. In one or more embodiments, one or more of APPs 6410-6430 and/or OS 6440 can be executable by processor 6010 to implement one or more systems, processes, and/or methods described herein. In one or more embodiments, configuration 6450 can include network information associated with network elements and/or devices coupled to wireless AP 1210. For example, the network information can include one or more rules associated with communicating information with SAP 2010 and/or interacting with SAP 2010. In one or more embodiments, one or more of wireless APs 1220 and 1230 can include same or similar structures and/or functionalities of those described with reference to wireless AP 1210.

Figure 7:
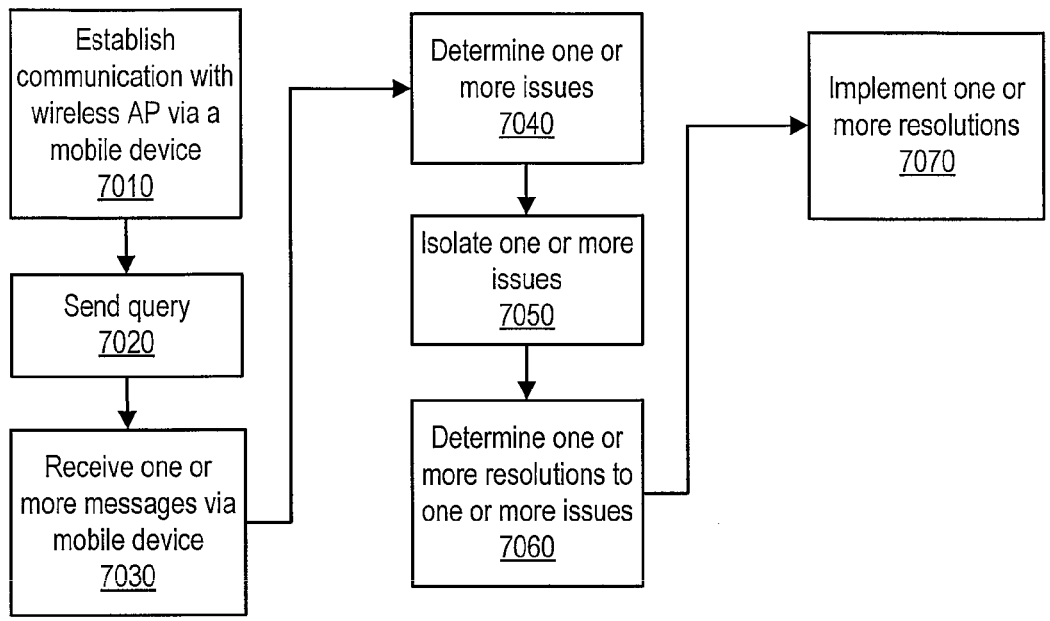
FIG. 7 provides a method to determine, isolate, and resolve one or more issues, according to one or more embodiments.

Turning now to FIG. 7, a method to determine, isolate, and resolve one or more issues is illustrated, according to one or more embodiments. At 7010, communication can be established with a wireless AP via a mobile device. For example, communication can be established with wireless AP 1220 via MD 1321 and network 1410. In one or more embodiments, a wireless AP can be used in implementing a wireless local area network (WLAN), and establishing communication with the wireless AP can establish communication with the WLAN.

At 7020, one or more faults can be detected. In one example, the wireless AP can detect the one or more faults. In another example, one or more devices coupled to the wireless AP can detect the one or more faults. In one or more embodiments, the one or more faults can indicate and/or include one or more performance anomalies (e.g., packet loss, packet jitter, packet delay, network connectivity, and/or packet latency, among others).

At 7025, one or more messages associated with the one or more detected faults can be sent via the mobile device. In one or more embodiments, the one or more messages associated with the one or more detected faults can be sent to SAP 2010. In one example, the one or more messages associated with the one or more detected faults can be sent by wireless AP 1220 via MD 1321 and network 1410. In a second example, the one or more messages associated with the one or more detected faults can be sent by device 1120 via wireless AP 1220, MD 1321, and network 1410. In another example, the one or more messages associated with the one or more detected faults can be sent by device 1120 via MD 1321 and network 1410 without using wireless AP 1220. In one or more embodiments, MD 1321 can communicate directly with device 1120. In one or more embodiments, MD 1321 can include one or more structures and/or functionalities associated with wireless AP 1220. For example, the one or more faults may be associated with AP 1220, and MD 1321 can provide wireless AP functionality to one or more of devices 1120-1122.

At 7030, the one or more messages associated with the one or more detected faults can be received via the mobile device. In one or more embodiments, SAP 2010 can receive one or more messages, associated with one or more of devices 1120-1122, the WLAN, a gateway coupling wireless AP 1220 to network 1420, and wireless AP 1220, via MD 1321 and network 1410. For instance, the one or more messages can include network management data and/or messages, performance data, and/or fault messages, among others. In one or more embodiments, SAP 2010 can receive the one or more messages via EMS 2110. In one or more embodiments, SAP 2010 can receive the one or more messages via network 1410 directly.

At 7040, one or more issues can be determined. In one example, FM/PM 2020 can receive data associated with the one or more messages that can include network management data and/or messages, performance data, and/or fault messages, among others, and can determine one or more issues associated with and/or indicated by the one or more messages. In one instance, the one or more messages that can be associated with and/or indicate one or more hardware faults. In another instance, the one or more messages that can be associated with and/or indicate one or more of packet loss, packet jitter, packet delay, network connectivity, and packet latency, among others.

At 7050, the one or more issues can be isolated. For example, trouble isolation module 2030 can receive the one or more issues determined by FM/PM Module 2020 and can isolate the one or more issues to a device and/or a side of a demarc. In one or more embodiments, trouble isolation module 2030 can communicate with one or more devices to isolate the one or more issues. In one example, trouble isolation module 2030 can communicate with one or more of devices 1120-1122, MDs 1320 and 1321, and wireless AP 1220 to isolate one or more issues associated with location 1020. In another example, trouble isolation module 2030 can communicate with one or more network elements of network 1420 and/or one or more network elements and/or devices that are used to provide communications of one or more devices at location 1020 with network 1420.

At 7060, one or more resolutions to the one or more issues can be determined. For example, maintenance module 2040 can determine the one or more resolutions to the one or more issues. For instance, maintenance module 2040 can determine one or more actions that can be taken to resolve the one or more issues. At 7070, the one or more resolutions can be implemented. For example, maintenance module 2040 can implement the one or more resolutions to resolve the one or more issues. In one instance, implementing the one or more resolutions can include maintenance module 2040 sending, providing, and/or issuing one or more messages (e.g., network control and/or device control messages) that can resolve, address, and/or correct the one or more issues.

In one or more embodiments, implementing the one or more resolutions can include maintenance module 2040 providing and/or issuing one or more maintenance tickets and/or maintenance requests for one or more service personnel to address the one or more issues. In one example, the one or more service personnel can address one or more issues that may not be able to be addressed by maintenance module 2040. In one instance, the one or more service personnel can be dispatched (e.g., by maintenance module 2040) to physically inspect, repair, and/or replace one or more devices in an implementation of the one or more resolutions.

Figure 8:
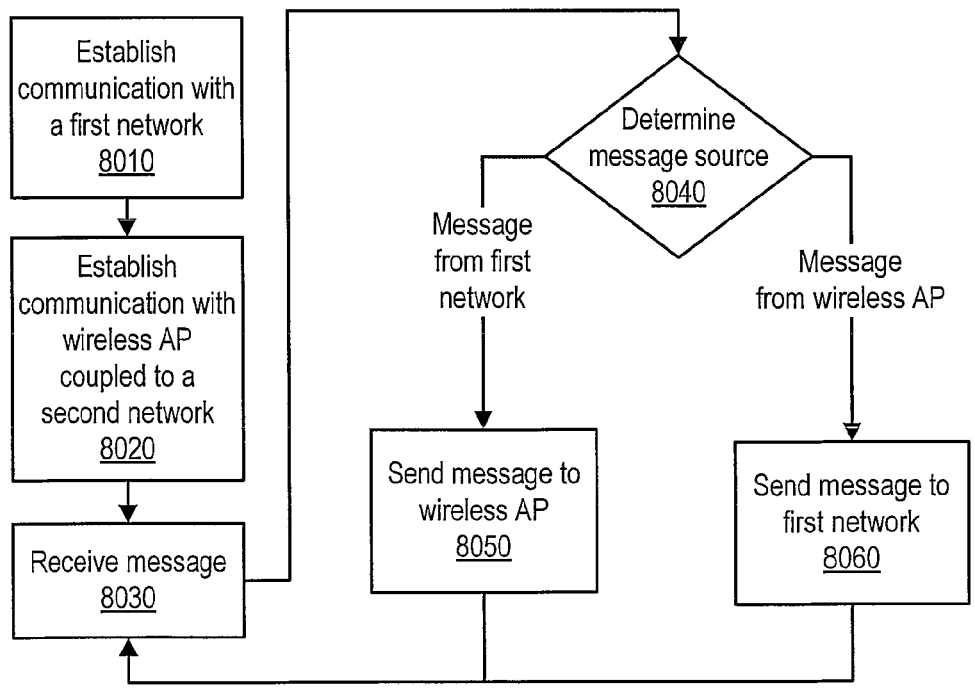
FIG. 8 provides a method to operate a mobile device, according to one or more embodiments.

Turning now to FIG. 8, a method to operate a mobile device is illustrated, according to one or more embodiments. At 8010, communication with a first network can be established. For example, MD 1320 can establish communication with network 1410 (e.g., the first network). At 8020, communication with a WLAN can be established. In one or more embodiments, establishing communication with the WLAN can include establishing communication with a wireless AP. For example, MD 1320 can establish communication with wireless AP 1220, which is coupled to network 1420 (e.g., a second network). In one or more embodiments, the WLAN may not be coupled to a second network (e.g., network 1420) due to a fault and/or an issue. For example, the fault and/or the issue can be associated with one or more of the WLAN and the wireless AP being not coupled to the second network.

At 8030, a message can be received. In one or more embodiments, the message can include one or more of network management data, a network management message, a fault message, a performance message, a simple network management protocol (SNMP) message, an Internet control message protocol (ICMP) message, a routing protocol message, and an acknowledgement message, among other messages that can be used by SAP 2010 and/or in operation of SAP 2010.

At 8040, a message source can be determined. If the message source is determined to be from the first network, the method can proceed to 8050, where the message can be sent to the WLAN in communication with the mobile device. If the message source is determined to be from the WLAN in communication with the mobile device, the method can proceed to 8060, where the message can be sent to the first network. In one or more embodiments, sending the message to the first network can include sending the message to SAP 2010 via network 1410.

In one or more embodiments, the method can proceed to 8030 where an additional message can be received. In this fashion, the mobile device can permit and/or implement at least a portion of an alternate communication path to a location, according to one or more embodiments. In one or more embodiments, the mobile device can function as a gateway device and/or bridge device coupling the WLAN to network 1410. For example, MD 1320 can permit and/or implement at least a portion of an alternate communication path to location 1020 via network 1410. For instance, a communication path via wireless AP 1220 and/or network 1420 may be associated with one or more issues, and the alternate communication path can be used to identify, isolate, and/or resolve the one or more issues.

In one or more embodiments, one or more of the methods illustrated in FIG. 7 and FIG. 8 can be transparent to a user of the mobile device. In one example, a user of the mobile device can use the mobile device in a service call to an agent of a network provider while the agent can use SAP 2010 identify, isolate, and/or resolve the one or more issues via network 1410 and the mobile device. In another example, the mobile device can be in a vicinity of the wireless AP sufficient to communicate with the wireless AP, and one or more of the methods illustrated in FIG. 7 and FIG. 8 can be performed automatically and/or in a transparent fashion (e.g., without alerting, informing, and/or providing notice to the user of the mobile device).

In one or more embodiments, the term "memory" can mean a "memory medium" and/or "computer readable medium" which is intended to include various types of memory or storage, including an installation medium, e.g., a CD-ROM, or floppy disks, a random access memory or computer system memory such as DRAM, SRAM, EDO RAM, Rambus RAM, NVRAM, EPROM, EEPROM, flash memory etc., and/or a non-volatile memory such as a magnetic media, e.g., a hard drive, and/or optical storage. The memory medium can include other types of memory as well, or combinations thereof. In one or more embodiments, the memory medium can be and/or include an article of manufacture and/or a software product. For example, an article of manufacture and/or a software product can include a memory medium that includes instructions executable by a processor to perform one or more portions of one or more methods and/or processes described herein.

In addition, the memory medium can be located in a first computer in which the programs are executed, or can be located in a second different computer and/or hardware memory device that connects to the first computer over a network. In one or more embodiments, the second computer provides the program instructions to the first computer for execution. The memory medium can also be a distributed memory medium, e.g., for security reasons, where a portion of the data is stored on one memory medium and the remaining portion of the data can be stored on a different memory medium. Also, the memory medium can include one of the networks to which the current network is coupled, e.g., a SAN (Storage Area Network).

In one or more embodiments, each of the systems described herein may take various forms, including a personal computer system, server computer system, workstation, network appliance, Internet appliance, wearable computing device, personal digital assistant (PDA), laptop, mobile telephone, mobile multimedia device, embedded computer system, television system, and/or other device. In general, the terms "computing device", "computer", and/or "computer system" can be broadly defined to encompass any device having a processor which executes instructions from a memory medium.

It is noted that, in one or more embodiments, one or more of the method elements described herein and/or one or more portions of an implementation of a method element may be performed in varying orders, can be performed concurrently with one or more of the other method elements and/or one or more portions of an implementation of a method element, or can be omitted. Additional method elements can be performed as desired. In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art a general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
establishing a first communication path from a service assurance platform to a wireless access point via a mobile device coupled to a first network, wherein the wireless access point is configured to provide a wireless local area network and to communicate with a second network, wherein the wireless access point is communicatively coupled to the service assurance platform via a second communication path, wherein the second communication path is provided via the second network, and wherein the second communication path is distinct from the first communication path;
receiving, from the mobile device via the first communication path, at least one message from the wireless access point or a device configured to communicate with the wireless access point;
determining at least one issue using the at least one message;
isolating the at least one issue; and
determining at least one resolution to the at least one issue.

2. The method of claim 1, wherein isolating the at least one issue includes determining a side of a demarcation point that is associated with the at least one issue.

3. The method of claim 1, wherein the at least one message indicates at least one of packet loss, packet jitter, packet delay, network connectivity, packet latency, and a fault.

4. The method of claim 1, wherein isolating the at least one issue includes determining at least one device associated with the at least one issue, wherein the at least one device includes the wireless access point, a network device used in providing communication to the wireless access point via the second network, or the device configured to communicate with the wireless access point.

5. The method of claim 1, wherein isolating the at least one issue includes determining that at least one of the wireless access point and the device is associated with the at least one issue; the method further comprising:
sending, via the mobile device and the first network, at least one of a network control message and a device control message to the at least one of the wireless access point and the device to address the at least one issue.

6. The method of claim 1, wherein isolating the at least one issue includes determining that a network provider side of a demarcation point is associated with the at least one issue; the method further comprising:
issuing at least one maintenance request for at least one service personnel, associated with the network provider, to address the at least one issue.

7. The method of claim 1, wherein isolating the at least one issue includes determining that a network provider side of a demarcation point is associated with the at least one issue; the method further comprising:
sending at least one of a network control message and a device control message to at least one device that implements the second network to address the at least one issue.

8. A system, comprising:
a processor; and
a memory medium coupled to the processor, wherein the memory medium includes instructions that when executed by the processor, cause the processor to perform operations comprising:
establishing a first communication path from a service assurance platform to a mobile devic coupled to a first network, with a wireless access point via a mobile device coupled to a first network, wherein the wireless access point is configured to provide a wireless local area network and to communicate with a second network, wherein the wireless access point is communicatively coupled to the service assurance platform via a second communication path, and wherein the second communication path is provided via the second network;
receiving, from the mobile device via the first communication path, at least one message from the wireless access point or a device configured to communicate with the wireless access point;
determining at least one issue using the at least one message;
isolating the at least one issue; and
determining at least one resolution to the at least one issue.

9. The system of claim 8, wherein isolating the at least one issue includes determining a side of a demarcation point that is associated with the at least one issue.

10. The system of claim 8, wherein the at least one message indicates at least one of packet loss, packet jitter, packet delay, network connectivity, packet latency, and a fault.

11. The system of claim 8, wherein isolating the at least one issue includes determining at least one device associated with the at least one issue, wherein the at least one device includes the wireless access point, a network device used in providing communication to the wireless access point via the second network, or the device configured to communicate with the wireless access point.

12. The system of claim 8, wherein isolating the at least one issue includes determining that at least one of the wireless access point and the device is associated with the at least one issue, and wherein the operations further comprise:
sending, via the mobile device and the first network, at least one of a network control message and a device control message to the at least one of the wireless access point and the device to address the at least one issue.

13. The system of claim 8, wherein isolating the at least one issue includes determining that a network provider side of a demarcation point is associated with the at least one issue, and wherein the operations further comprise:
sending, via the mobile device and the first network, at least one of a network control message and a device control message to the at least one of the wireless access point and the device to address the at least one issue.

14. The system of claim 8, wherein isolating the at least one issue includes determining that a network provider side of a demarcation point is associated with the at least one issue, and wherein the operations further comprise to further perform:
sending at least one of a network control message and a device control message to at least one device that implements the second network to address the at least one issue.

15. A computer readable storage device comprising instructions, which when executed on a processing system, cause the processing system to perform operations comprising:
- establishing a first communication path from a service assurance platform to a wireless access point via a mobile device coupled to a first network, wherein the wireless access point is configured to provide a wireless local area network and to communicate with a second network, wherein the wireless access point is communicatively coupled to the service assurance platform via a second communication path, and wherein the second communication path is provided via the second network;
- receiving, from the mobile device via the first communication path, at least one message from the wireless access point or a device configured to communicate with the wireless access point;
- determining at least one issue using the at least one message;
- isolating the at least one issue; and
- determining at least one resolution to the at least one issue.

16. The computer readable storage device of claim 15, wherein isolating the at least one issue includes determining a side of a demarcation point that is associated with the at least one issue.

17. The computer readable storage device of claim 15, wherein the at least one message indicates at least one of packet loss, packet jitter, packet delay, network connectivity, packet latency, and a fault.

18. The computer readable storage device of claim 15, wherein isolating the at least one issue includes determining that at least one of the wireless access point and the device is associated with the at least one issue, and wherein the operations further comprise:
- sending, via the mobile device and the first network, at least one of a network control message and a device control message to the at least one of the wireless access point and the device to address the at least one issue.

19. The computer readable storage device of claim 15, wherein isolating the at least one issue includes determining that a network provider side of a demarcation point is associated with the at least one issue; and wherein the operations further comprise:
- issuing at least one maintenance request for at least one service personnel, associated with the network provider, to address the at least one issue.

20. The computer readable storage device of claim 15, wherein isolating the at least one issue includes determining that a network provider side of a demarcation point is associated with the at least one issue, and wherein the operations further comprise:
- sending at least one of a network control message and a device control message to at least one device that implements the second network to address the at least one issue.

* * * * *

UNITED STATES PATENT AND TRADEMARK OFFICE
CERTIFICATE OF CORRECTION

PATENT NO. : 8,406,207 B2
APPLICATION NO. : 12/829721
DATED : March 26, 2013
INVENTOR(S) : Moshiur Rahman et al.

It is certified that error appears in the above-identified patent and that said Letters Patent is hereby corrected as shown below:

In the Claims section, Column 16, Lines 12-13, "assurance platform to a mobile device coupled to a first network, with a wireless access point via a mobile" should read --assurance platform to a wireless access point via a mobile--.

Signed and Sealed this
Eighteenth Day of June, 2013

Teresa Stanek Rea
*Acting Director of the United States Patent and Trademark Office*